(12) United States Patent
Inhelder

(10) Patent No.: US 11,975,934 B2
(45) Date of Patent: May 7, 2024

(54) WINDING DEVICE FOR A LONGITUDINALLY CUT MATERIAL WEB AND SYSTEM FOR THE CONTROLLED WINDING OF A LONGITUDINALLY CUT MATERIAL WEB

(71) Applicant: FMS Force Measuring Systems AG, Oberglatt (CH)

(72) Inventor: Jörg Inhelder, Nürensdorf (CH)

(73) Assignee: FMS Force Measuring Systems AG, Oberglatt (CH)

(*) Notice: Subject to any disclaimer, the term of this patent is extended or adjusted under 35 U.S.C. 154(b) by 0 days.

(21) Appl. No.: 18/347,449

(22) Filed: Jul. 5, 2023

(65) Prior Publication Data

US 2023/0348219 A1 Nov. 2, 2023

Related U.S. Application Data

(63) Continuation of application No. PCT/EP2022/064183, filed on May 25, 2022.

(30) Foreign Application Priority Data

Nov. 6, 2021 (EP) .................................... 21179078

(51) Int. Cl.
*B65H 18/10* (2006.01)
*B65H 23/04* (2006.01)
(Continued)

(52) U.S. Cl.
CPC ......... *B65H 18/106* (2013.01); *B65H 23/044* (2013.01); *B65H 23/1955* (2013.01);
(Continued)

(58) Field of Classification Search
CPC .......................... B65H 18/106; B65H 23/044; B65H 23/1955; B65H 2301/41486; H02K 3/04; H02K 7/08
See application file for complete search history.

(56) References Cited

U.S. PATENT DOCUMENTS 3,424,395 A * 1/1969 Schmidt ............... B65H 18/106
242/545.1
4,063,692 A 12/1977 Buggy
(Continued)

FOREIGN PATENT DOCUMENTS

DE 102019110138 A1 † 10/2020

OTHER PUBLICATIONS

International Search Report from International Application No. PCT/EP2022/064183 dated Aug. 30, 2022.
(Continued)

*Primary Examiner* — Sang K Kim
(74) *Attorney, Agent, or Firm* — Frank Rosenberg

(57) ABSTRACT

The present invention relates to a device (20) for winding a longitudinally cut material web having multiple longitudinal strips (12) on a plurality of winding tubes (16) to form in each case a wound roll. The device comprises an axle (24) and, mounted on the axle, a plurality of ring-shaped winding drives (22) that are individually controllable in their operating position. Each winding drive (22) forms an external-rotor electric motor and comprises a static interior tube (40) and a rotatable external tube (50). The external tube (50) that is rotatable on the rolling bearings (48) bears, on its interior, a device for providing an excitation magnetic field (52) that forms the external rotor of the electric motor.

14 Claims, 3 Drawing Sheets

Figure 1:
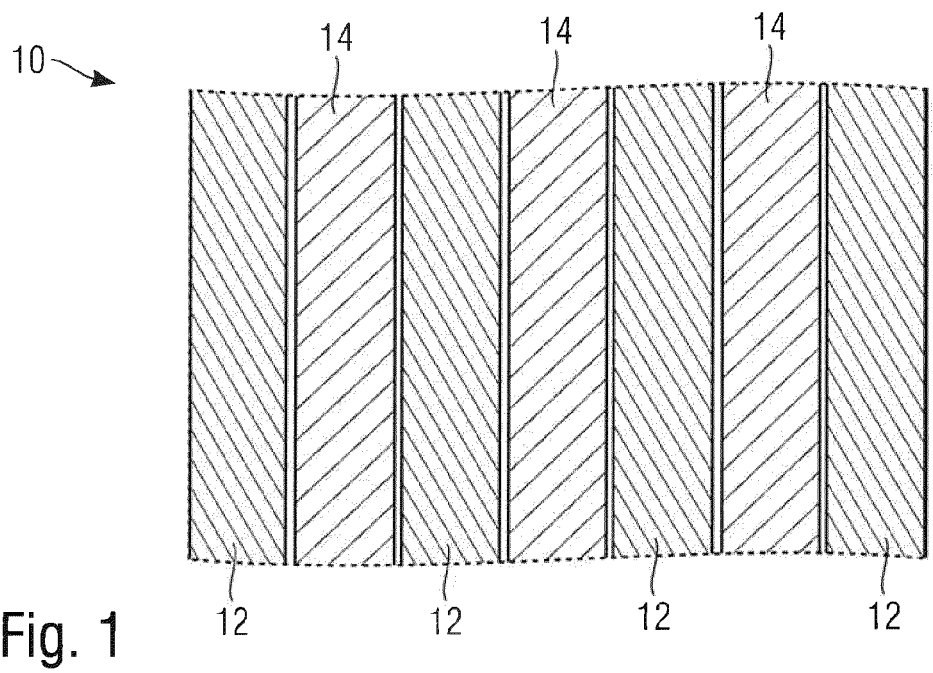

(51) Int. Cl.
　　*B65H 23/195*　　(2006.01)
　　*H02K 3/04*　　(2006.01)
　　*H02K 7/08*　　(2006.01)

(52) U.S. Cl.
　　CPC .............. *H02K 3/04* (2013.01); *H02K 7/08* (2013.01); *B65H 2301/41486* (2013.01); *B65H 2403/92* (2013.01); *B65H 2403/943* (2013.01); *B65H 2408/23* (2013.01); *B65H 2555/11* (2013.01)

(56) References Cited

U.S. PATENT DOCUMENTS

| | | | |
|---|---|---|---|
| 4,181,270 A | | 1/1980 | Laar et al. |
| 4,693,431 A | * | 9/1987 | Kataoka ............... B65H 75/247 |
| | | | 242/415.1 |
| 5,180,115 A | * | 1/1993 | Stein .................... B65H 18/106 |
| | | | 242/415.1 |
| 5,478,025 A | | 12/1995 | Wang |
| 6,267,318 B1 | * | 7/2001 | Gensheimer ......... B65H 18/021 |
| | | | 242/576.1 |
| 6,357,691 B1 | * | 3/2002 | Watanabe ............ B65H 18/106 |
| | | | 242/909 |
| 7,579,742 B1 | † | 8/2009 | Rittenhouse |
| 2023/0152171 A1 | | 5/2023 | Inhelder |

OTHER PUBLICATIONS

Translation of the International Search Report from International Application No. PCT/EP2022/064183 dated Aug. 30, 2022.
Written Opinion of the International Search Authority from International Application No. dated Aug. 30, 2022.
"Segmented Measuring Roller—slitter rewinder", FMS Force Measuring Systems AG, published Apr. 19, 2021, source: https://web.archive.org/web/20210419181334/https://www.fms-technology.com/en/about-us/newsportal/segmented-measuring-roller-slitter-rewinder).†

* cited by examiner
† cited by third party

WINDING DEVICE FOR A LONGITUDINALLY CUT MATERIAL WEB AND SYSTEM FOR THE CONTROLLED WINDING OF A LONGITUDINALLY CUT MATERIAL WEB

RELATED APPLICATIONS

This application is a continuation and claims the priority benefit of PCT/EP2022/064183, filed 25 May 2022, and of EP Patent Application No. 21179078.7, filed 6 Nov. 2021.

The present invention relates to a device for winding a longitudinally cut material web having multiple longitudinal strips onto a plurality of winding tubes to form in each case a wound roll. The present invention further relates to a system for the controlled winding of a longitudinally cut material web having multiple longitudinal strips with such a winding device.

In plants for manufacturing or processing web-type materials, such as paper, plastic foils or aluminum foils, at the start of the processing operation, the material webs are processed having web widths of multiple meters. For further processing, for example in label printing or packaging manufacture, often significantly narrower webs are needed, and for this, the material webs are cut into narrower longitudinal strips of the desired width on slitter winders.

To this end, for web widths of typically up to about two meters, secondary slitter winders having through shafts are used for winding, which through shafts rotate at overspeed and work with friction. Arranged on the through shaft are cardboard tubes onto which the cut material is wound. What is disadvantageous here is that, due to the friction, on the one hand, there is a lot of incidental dust, and on the other hand, the effective winding tension is very strongly dependent on the friction coefficient of the cardboard tube on the shaft.

Since the friction coefficients of the cardboard tubes can vary greatly, currently, so-called differential shafts are increasingly being used, in which the friction point is integrated in the friction shaft and the cardboard tubes sit firmly outside on an outer ring. Due to the arrangement of the friction point within the friction shaft, more precise friction coefficients can be realized and cardboard wear avoided. However, also with such differential shafts, exact control of the individual tensions is not possible, since each individual winding tension is determined by the overspeed and the friction of the friction rings. A further disadvantage consists in the fact that, with such friction rollers, errors in individual windings can be identified during the process only in the event of extreme discrepancies, for example if the material tears or is completely slack.

This is where the present invention begins. The object of the present invention, as it is characterized in the claims, is to specify a winding device of the kind mentioned above, with which the multiple longitudinally cut material strips of a material web can be wound, individually controlled, to each form a wound roll. Furthermore, an advantageous system for the controlled winding of a longitudinally cut material web having multiple longitudinal strips is intended to be provided.

Said object is solved by the features of the independent claims. Developments of the present invention are the subject of the dependent claims.

According to the present invention, a generic device for winding a longitudinally cut material web includes an axle and, mounted on the axle, a plurality of ring-shaped winding drives. Here, the winding drives are individually controllable in their operating position. On their exterior, the winding drives are each adapted to receive a winding tube for winding a longitudinal strip of the material web.

Each winding drive forms an external-rotor electric motor and comprises a static interior tube and a rotatable external tube. Here, the static interior tube is mounted on the axle in a manner that prevents rotation, and preferably with little play. It bears on its exterior a stator having stator windings of the electric motor, and rolling bearings for receiving the rotatable external tube.

The external tube that is rotatable on the rolling bearings bears, on its interior, a device for providing an excitation magnetic field that forms the external rotor of the electric motor. On its exterior, the external tube comprises a blocking device for the winding tubes to be received.

The winding drives are particularly advantageously separately slidable on the axle and lockable in an axial operating position in which they are individually controllable. In this way, the device can be easily adapted to winding different cut material webs having differing numbers and positions of the material strips.

The device for providing an excitation magnetic field is advantageously formed by a plurality of permanent magnets. This facilitates a reliable and low-maintenance, brushless formation of the electric motor.

The axle is preferably furnished with electrical conductors that extend substantially across the entire width in the axial direction, that are axially contactable at every position, and with which the winding drives are suppliable in their operating positions with electrical energy and operating data and in this way are individually controllable.

The electrical conductors of the axle advantageously comprise axial power rails that are arranged in an axially running guide chamber in the axle.

Each winding drive is advantageously equipped with a separate power element that is controllable via the electrical conductors of the axle.

To prevent rotation, the static interior tube is expediently furnished with a torque support that particularly preferably meshes with a recess in the axle profile of the axle.

The axle advantageously comprises an axial groove and, arranged in the groove, a terminal block for locking the winding drives. The terminal block can be activatable, for example, by compressed air.

In one advantageous development of the present invention, the axle comprises at least one bore for a cooling water channel.

According to one advantageous embodiment, the axle is formed as an extruded profile having recesses. Here, one recess preferably serves to receive the torque support of the static interior tube and/or one recess forms a guide chamber for the axially running power rails and/or one recess forms an axial groove for the terminal block for locking the winding drives, and/or at least one recess forms a bore for forming a cooling channel.

While the formation of the axle as an extruded profile is currently preferred, alternatively, the axle can also be formed in another way, for example as a welding construction or as a milled axle in which the required recesses are milled into a solid body.

There are advantageously arranged on the axle at least two, three, four or more winding drives. In advantageous embodiments, between N=10 and N=20 winding drives (each inclusive) are arranged on the axle. However, it is understood that, depending on the requirements, in practice, also a smaller or larger number of winding drives on the axle can be provided.

In one preferred embodiment, for winding a longitudinally cut material web having N≥2 longitudinal strips, N winding drives are arranged and locked spaced apart on the axle and are in electrical contact with the conductors, especially the power rails in the axle.

The winding drives can all comprise the same width, or winding drives having differing widths can also be used, for example to wind longitudinal strips having differing widths. For winding wider longitudinal strips, two or more winding drives can also be interconnected.

The device is especially arranged and adapted for winding a longitudinally cut material web having a total width of 2.50 m or less, preferably of 2.00 m or less.

The present invention also includes a system for the controlled winding of a longitudinally cut material web having multiple longitudinal strips onto a plurality of winding tubes to form in each case a wound roll. The system comprises a winding device of the kind described, an individually controllable winding drive of the winding device being assigned to each of the longitudinal strips to be wound. The system further comprises a force measuring device for measuring web tensions of the longitudinal strips of the cut running material web, and a control system that is adapted and arranged to measure, by means of the force measuring device, the web tensions in the multiple longitudinal strips of the material web, to compare, for the winding, the web tensions with set web tensions of the individual longitudinal strips and, based on the comparison, to control the assigned winding drives of the winding device in order to adapt the measured web tensions to the predetermined set web tensions.

In said system, it is advantageously provided that
the force measuring device comprises an axle and, supported on the axle, a measuring roller wrapped around by the material web,
the measuring roller is formed as a segmented measuring roller having two or more measuring segments that are separately slidable on the axle and lockable in a measuring position on the axle in order to position the measuring segments in the transverse direction of the material web in accordance with desired measuring positions such that longitudinal sections of the material web wrap around one measuring segment each, the measuring segments for measuring the web tensions of the longitudinal strips of the longitudinally cut material web being positioned and locked on the axle with spaced apart roll shells,
the measuring segments each comprise a load cell that serves to determine the web tension of the longitudinal section of the material web wrapped around the respective measuring segment and that provides a mount with which the measuring segment is mounted on the axle, and
the axle is furnished with electrical conductors that extend substantially in the axial direction across the entire width, that are axially contactable at every position and with which the measuring signals supplied by the load cells of the measuring segments are conductible to an evaluation unit arranged on an axle end.

The above-mentioned disadvantages, problems and uncertainties of conventional winding devices can be overcome with the described individually motor-controlled winding device. The proposed system enables, through a coaction of the winding device described here with a force measuring device for individually measuring web tension, ideal control conditions such as have been standard in machines for processing uncut webs for some time already to be achieved also for the winding of cut webs.

Further exemplary embodiments and advantages of the present invention are explained below by reference to the drawings, in which a depiction to scale and proportion was dispensed with in order to improve their clarity.

Figure 2:
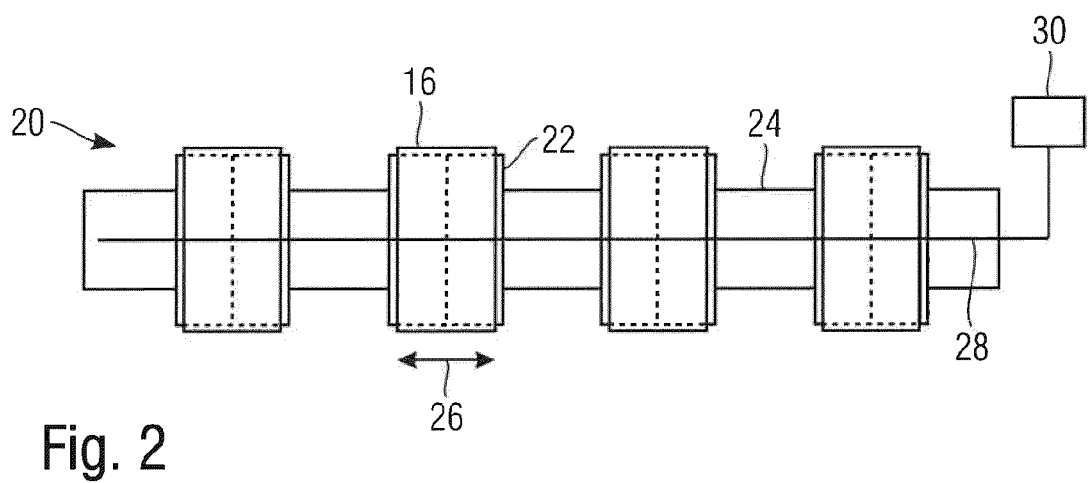
Figure 3:
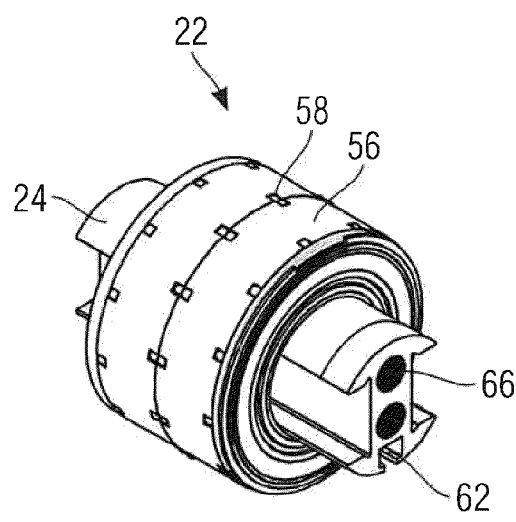
Figure 4:
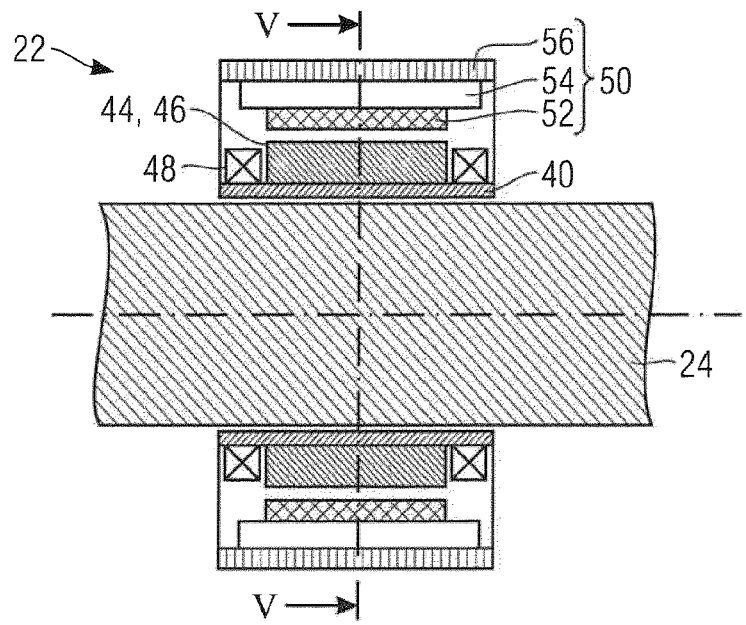
Figure 5:
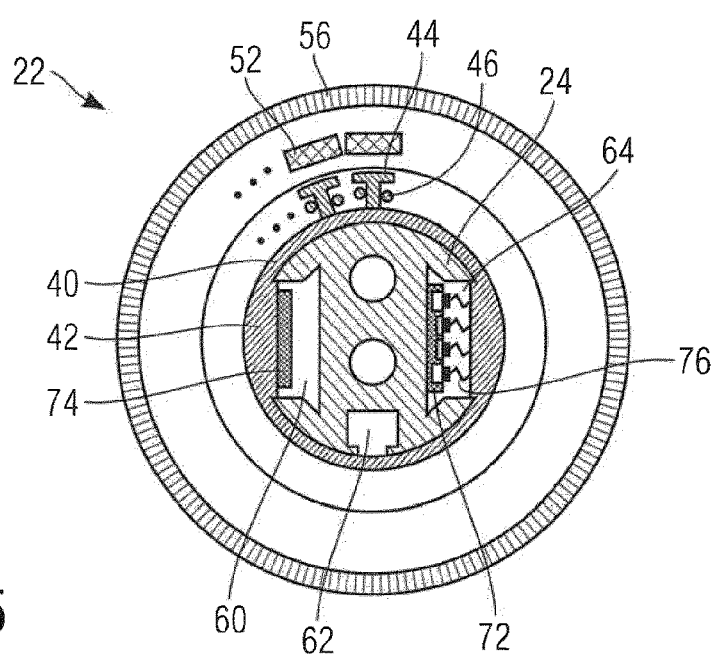
Figure 6:
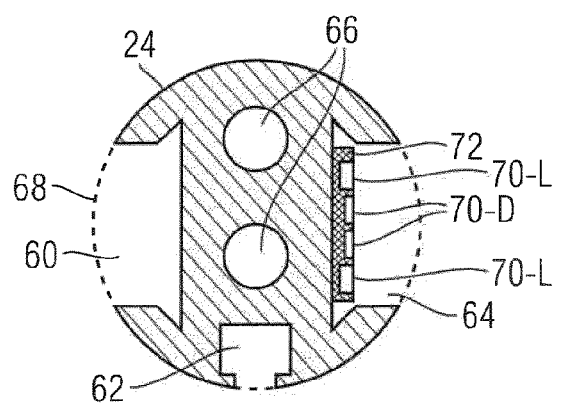
Figure 7:
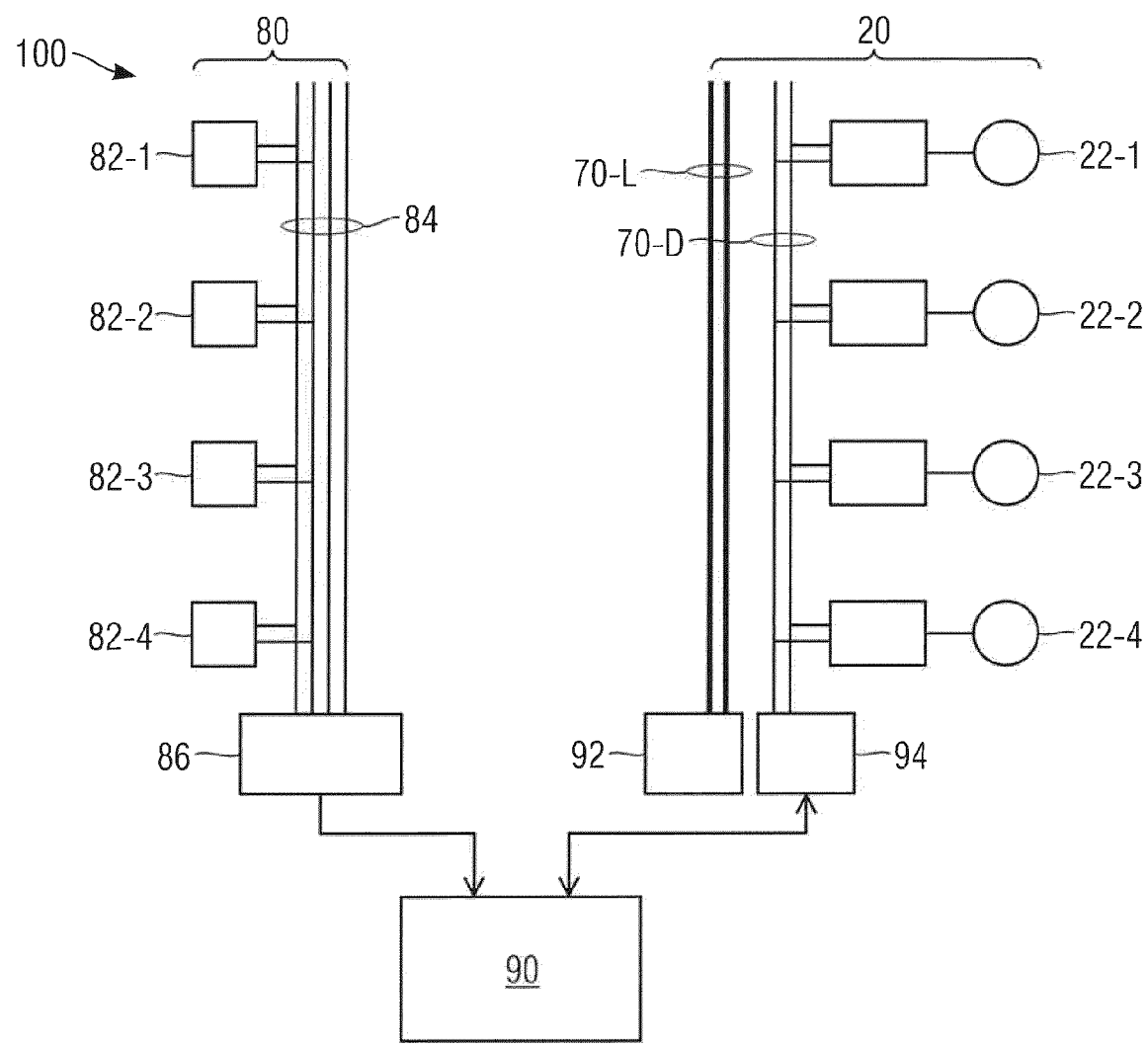

Shown are:

FIG. 1 schematically, a cut material web having longitudinal strips that are each intended to be individually wound onto a cardboard tube, FIG. 2 schematically, a winding device according to the present invention, FIG. 3 for an exemplary embodiment of the present invention, in perspective view, one of the winding drives on the axle, FIG. 4 schematically, a cross section through the winding drive and the axle in FIG. 3, FIG. 5 schematically, a sectional view of the winding drive and the axle in a direction corresponding to the line V-V in FIG. 4, FIG. 6 the axle in FIGS. 3 to 5 separately, and FIG. 7 an exemplary embodiment of a tension control having an inventive winding device in coaction with a force measuring device for measuring the web tensions of the individual longitudinal strips of a material web.

The present invention will now be explained with reference to an advantageous device for individually winding a longitudinally cut material web. The described device constitutes a secondary slitter winder in which a material web 10 having a total width of typically up to two meters, depicted schematically in FIG. 1, is provided, is cut into narrower webs 12, 14, and the narrower webs 12, 14 in turn are wound on appropriately narrower winding tubes to form narrow wound rolls. The material web 10 can, for example, be label material, plastic foils, aluminum foils, battery foils or the like.

Here, the running direction of the material web 10 defines a longitudinal direction and a transverse direction perpendicular thereto. After cutting, the cut longitudinal strips 12, 14 of the material web 10 for winding are typically conducted alternatingly upward and downward in different planes such that the longitudinal strips originally lying adjacent to one another in the transverse direction do not interfere with the winding.

In the exemplary embodiment, the winding of N=4 longitudinal strips 12 of one of the two planes is shown for illustration. Here, the longitudinal strips 12 of the material web are each wound individually by the winding device 20 described below onto a cardboard tube 16 (FIG. 2) to form a wound roll. Analogously, the longitudinal strips 14 that lie between the longitudinal strips 12 are wound in a higher- or lower-lying plane, for example by a further device according to the present invention.

For Illustration, a variant in which the cut longitudinal strips 12, 14 of the material web 10 all comprise the same width is depicted. However, it is likewise possible that the material web 10 is cut into longitudinal strips of differing strip widths, and the longitudinal strips of differing widths are wound with a device according to the present invention.

With reference to the schematic depiction in FIG. 2, there is used for the controlled winding of the longitudinal strips 12 in FIG. 1 an inventive winding device 20 having a plurality of ring-shaped, individually controllable winding drives 22 that are locked along the transverse direction at certain axial positions of a rigid axle 24 according to the requirements of the longitudinal strips 12 to be wound.

Onto the winding drives 22 are put cardboard tubes 16 that are each fixed by a blocking device and onto which the longitudinal strips 12 of the material web are wound. By way of example, FIG. 2 shows N=4 winding drives 22 for four longitudinal strips 12 of the same width, but it is understood that, if needed, also more than four winding drives and/or winding drives for winding longitudinal strips 12 of differing widths can be arranged on an axle 24.

The axle 24 is formed as a smart axle that comprises electrical conductors 28 that extend substantially across the entire width in the axial direction and that are axially contactable at every position by the winding drives 22. In the idle state of the device, the winding drives 22 can be placed on the axle as needed, shifted axially along the axle (reference sign 26) and locked in any arbitrary axial operating position.

In their operating position, the winding drives contact the electrical conductors 28 and, in this way, are supplied with electrical energy and operating data by a power supply and control device 30. The electrical conductors 28 can run on the exterior of the axle 24, for example in an axial groove, but are preferably arranged in an internal axial guide chamber in the axle 24, as explained in greater detail below.

One advantageous formation of the winding drives 22 and the smart axle 24 will now be described in greater detail with reference to FIGS. 3 to 6. Here, FIG. 3 shows one of multiple winding drives 22 of the same kind in perspective view on the axle 24, FIG. 4 shows, schematically, a cross section through the winding drive 22 and the axle 24 in FIG. 3, and FIG. 5 shows, schematically, a sectional view of the winding drive 22 and the axle 24 in a direction corresponding to the line V-V in FIG. 4. In FIG. 5, also the inner structure of the axle 24 is depicted, which is omitted in FIG. 4 for the sake of clearer illustration. FIG. 6 shows the axle 24 in FIGS. 3 to 5 again separately.

Instead of a shaft that works with overspeed and friction, known from conventional secondary slitter winders, in the winding device according to the present invention, a stable axle 24 is used that, also with the expected high weights of the material rolls wound onto the cardboard tubes, displays hardly any deflection. A desired number of winding drives 22 are arranged and locked at the required axial positions on the axle 24 according to the requirements of the position and width of the longitudinal strips 12 of the material web 10 to be wound. Each of the winding drives 22 can receive, on its exterior, a cardboard tube 16 (FIG. 2), on which the material of the longitudinal strips 12 is wound.

The winding drives 22 each form an external rotor-electric motor that comprises a static interior tube 40 and a rotatable external tube 50. Each winding drive 22 builds on the axle 24 having the static interior tube 40 that is mounted on the axle 24 with minimal play and, in this way, in the idle state of the device, permits an axial shift of the winding drive 22 to a desired position.

To prevent rotation of the winding drives 22, the interior tube 40 is furnished with a torque support 42 that meshes with a recess 60 in the profile of the axle 24. The entire torque of the winding drive 22 is also absorbed there.

On its exterior, the interior tube 40 bears a stator 44 having the stator windings 46 of the electric motor, as well as rolling bearings 48 to receive the rotatable external tube 50, which lies on an outer face of the rolling bearing 48. On the interior of the external tube 50 are provided, attached in a receiver 54, permanent magnets 52 that form in each case the external rotor of the electric motor and are separated from the stator 44 by a narrow air gap. For the sake of clearer illustration, FIG. 5 shows only a portion of the stator 44 having stator teeth, the stator slots lying therebetween, and the stator windings 46 wound around the stator teeth, as well as the permanent magnets 52. The continuation of the stator and of the external-rotor permanent magnets along the circumference of the winding drive is indicated in each case by dots.

On its exterior, the external tube 50 includes a friction ring 56 that is furnished with a blocking device 58 (FIG. 3) for the cardboard tubes 16 to be received by the winding drive 22. The friction ring 56 can be formed, for example, as a ball friction ring having balls that run in roller hubs.

To prevent slipping on the axle in operation after axially positioning the winding drives 22, there is provided in an axial groove 62 of the axle 24 a terminal block (not depicted) that especially can be activated by compressed air, and after activation, holds the winding drives 22 securely in the chosen axial position.

The electrical energy needed for the winding drives 22 and the required operating data are provided at every axial position by power rails 70-L and 70-D, which are laid in a guide chamber 64 of the axle 24 and, in operation, are continuously contacted by every winding drive 22 (reference sign 76). To keep the number of power rails small, in the exemplary embodiment, each winding drive 22 has its own power element 74, such that two power rails for the power supply and two further power rails for the transmission of the operating data are sufficient for all drives. These four power rails 70-L, 70-D are arranged in an insulated mount 72 that is firmly joined with the axle 24.

Since, when the winding device 20 is in operation, considerable losses can result due to the efficiencies of the electric motors and the power elements, in the exemplary embodiment, two bores 66 for a cooling water channel are provided in the center of the axle 24. The furnishing of conventional friction shafts with cooling water channels, in contrast, is not possible due to the working principle since, for one thing, the shafts rotate, and for another, the entire assembly space is required for the generation of friction.

In the exemplary embodiment, the axle 24 of the device 20 is executed as an extruded profile, which permits a rigid formation of the axle, which is only minimally deformed or not at all, even in the event of high load due to the wound material rolls. With reference to FIG. 6, the extruded profile comprises a circular cross-sectional circumference 68 and is characterized by a wide central vertical bar that ensures the stability of the axle. In the extruded profile are provided, within the circular cross-sectional circumference 68, multiple recesses 60, 62, 64, 66 having differing functions. Specifically, the recess 60 receives the torque support 42 of the interior tube 40, the recess 64 forms a guide chamber for the power rails 70, the recess 62 forms a groove for the terminal block for locking the winding drives 22, and the bores 66 serve to form the said cooling channels.

The electric motors of the winding drives 22 are preferably arranged such that they can apply maximal web tension or the appropriate torque also at maximal winding diameter, and can apply the highest rotational speed at minimal winding diameter.

A winding device 20 according to the present invention can particularly advantageously be combined with a force measuring device that measures the web tensions of the individual longitudinal strips 12 of the material web 10 in order to realize ideal control conditions in winding the material strips.

A suitable force measuring device for measuring web tensions of a running material web is described in application PCT/EP2021/057456 of the same applicant. As key elements, such a force measuring device comprises an axle and, supported on the axle, a measuring roller wrapped around by the material web. Here, the measuring roller is formed as a segmented measuring roller having two or more measuring segments that are separately slidable on the axle and lockable in a measuring position on the axle in order to position the measuring segments in the transverse direction of the material web in accordance with desired measuring positions such that longitudinal sections of the material web each wrap around a measuring segment. The measuring segments each include a load cell that serves to determine the web tension of the longitudinal section of the material web wrapped around the respective measuring segment and that provides a mount with which the measuring segment is mounted on the axle. The axle is furnished with electrical conductors that extend substantially in the axial direction across the entire width, that are axially contactable at every position and with which the measuring signals supplied by the load cells of the measuring segments are conductible to an evaluation unit arranged on an axle end. Further details on the operating principle and advantageous embodiments of the force measuring device can be found in the international application PCT/EP2021/057456 mentioned above.

FIG. 7 illustrates, as an exemplary embodiment, the tension control in a system 100 for the controlled winding of a longitudinally cut material web 10 having multiple longitudinal strips 12 onto a plurality of winding tubes to form in each case a wound roll. Here, a winding device 20 according to the present invention coacts with an above-mentioned force measuring device 80 for measuring the web tensions of the longitudinal strips 12 of a material web 10.

For the sake of simpler illustration, in FIG. 7, the winding of just N=4 longitudinal strips of a material web is again assumed, but it is understood that also a greater number, for example up to N=40 longitudinal strips, can be wound simultaneously in a controlled manner with a winding device according to the present invention.

The left part of the image in FIG. 7 relates to measuring the web tensions of the N longitudinal strips with the aid of the force measuring device 80. For this, the measuring roller of the force measuring device comprises N=4 measuring segments 82-1 to 82-4 whose measuring signals are conducted to an evaluation unit 86 via power supply lines 84. The power supply lines 84 comprise, in addition to two lines for the power supply of the measuring segments, also two data lines with which the digitalized measuring signals are conducted to the evaluation unit 86 via a bus protocol.

Based on the measuring signals obtained, the evaluation unit 86 transmits operating data that describe the current state of the web tensions in the N longitudinal strips 12 to be wound to a central control unit 90 that forms the control system of the system 100.

The right part of the image in FIG. 7 illustrates the controlling of the N=4 winding drives 22-1 to 22-4 of the winding device 20. From one power supply 92 there run out two power rails 70-L that serve to supply power to the winding drives 22. Two further power rails 70-D are provided for the bidirectional data exchange between a control unit 94 of the winding device 20 and the respective power element of the winding drives 22-1 to 22-4.

In operation, in the control unit 90, for the N longitudinal strips, a control deviation is established in each case from the current values of the web tensions established by the force measuring device 80, and from said control deviation, suitable setpoints are determined for the current or the rotational speed of the electric motors of the associated winding drives 22-1 to 22-4. The established setpoints are transmitted to the control unit 94 of the winding device 20, and from said winding device to the power elements of the winding drives 22-1 to 22-4, where the drives are controlled accordingly based on the established setpoints.

As feedback, the winding drives 22 each transmit, via the power rails 70-D, the status of the power elements, the motor current and the rotational speed to the control unit 94, which transmits said data to the control unit 90.

It is understood that the embodiment of the described control system is only by way of example and that, for example, the allocation of the units 86, 90 and 94 in controlling the system can also be carried out in another manner.

The invention claimed is:

1. A device for winding a longitudinally cut material web comprising multiple longitudinal strips onto a plurality of winding tubes to form in each case a wound roll, comprising:
an axle and, mounted on the axle, a plurality of ring-shaped winding drives that are individually controllable in their operating position and that are each adapted on their exterior to receive a winding tube for winding a longitudinal strip of the material web,
each winding drive forming an external rotor electric motor and comprising a static interior tube and a rotatable external tube,
the static interior tube being non-rotatably mounted on the axle and bearing, on its exterior, a stator having stator windings of the electric motor, as well as rolling bearings for receiving the rotatable external tube, and
the external tube that is rotatable on the rolling bearings bearing, on its interior, a device for providing an excitation magnetic field that forms the external rotor of the electric motor, and comprising, on its exterior, a blocking device for the winding tubes to be received.

2. The device according to claim 1, characterized in that the winding drives are separately slidable on the axle and lockable in an axial operating position in which they individually are controllable.

3. The device according to claim 1, characterized in that the device for providing an excitation magnetic field is formed by a plurality of permanent magnets.

4. The device according to claim 1, characterized in that the axle is furnished with electrical conductors that extend substantially across the entire width in the axial direction, that are axially contactable at every position, and with which the winding drives are suppliable in their operating positions with electrical energy and operating data and in this way are individually controllable.

5. The device according to claim 4, characterized in that the electrical conductors of the axle comprise axial power rails that are arranged in an axially running guide chamber in the axle.

6. The device according to claim 4, characterized in that every winding drive is equipped with a separate power element that is controllable via the electrical conductor of the axle.

7. The device according to claim 1, characterized in that, to prevent rotation, the static interior tube is furnished with a torque support that meshes with a recess in the axle profile of the axle.

8. The device according to claim 1, characterized in that the axle comprises an axial groove and, arranged in the groove, a terminal block for locking the winding drives, which terminal block is activatable by compressed air.

9. The device according to claim 1, characterized in that the axle comprises at least one bore for a cooling water channel.

10. The device according to claim 1, characterized in that the axle is formed as an extruded profile having recesses, with one recess serving to receive the torque support of the static interior tube and/or one recess forming a guide chamber for the axially running power rails and/or one recess forming an axial groove for the terminal block for locking the winding drives, and/or at least one recess forming a bore to form a cooling channel.

11. The device according to claim 1, characterized in that at least two, three, four or more winding drives are arranged on the axle.

12. The device according to claim 1, characterized in that, for winding a longitudinally cut material web having $N \geq 2$ longitudinal strips, N winding drives are arranged and locked spaced apart on the axle and are advantageously in electrical contact with conductors.

13. The device according to claim 1, characterized in that the device is arranged and adapted for winding a longitudinally cut material web having a total width of 2.50 m or less.

14. A system for the controlled winding of a longitudinally cut material web comprising multiple longitudinal strips onto a plurality of winding tubes to form in each case a wound roll, comprising:

a winding device according to claim 1, an individually controllable winding drive of the winding device being assigned to each of the longitudinal strips to be wound, a force measuring device for measuring web tensions of the longitudinal strips of the cut running material web, and a control system that is adapted and arranged to measure, by means of the force measuring device, the web tensions in the multiple longitudinal strips of the material web, to compare, for the winding, the web tensions with set web tensions of the individual longitudinal strips, and based on the comparison, to control the assigned winding drives of the winding device in order to adapt the measured web tensions to the predetermined set web tensions.

* * * * *